United States Patent
Ryland

(10) Patent No.: US 11,597,611 B2
(45) Date of Patent: Mar. 7, 2023

(54) UNLOADING APPARATUS

(71) Applicant: TBS ENGINEERING LIMITED, Brockworth (GB)

(72) Inventor: Stuart Ryland, Brockworth (GB)

(73) Assignee: TBS ENGINEERING LIMITED, Gloucester (GB)

( * ) Notice: Subject to any disclaimer, the term of this patent is extended or adjusted under 35 U.S.C. 154(b) by 399 days.

(21) Appl. No.: 16/984,703

(22) Filed: Aug. 4, 2020

(65) Prior Publication Data

US 2021/0053771 A1   Feb. 25, 2021

(30) Foreign Application Priority Data

Aug. 20, 2019   (GB) ...................................... 1911949

(51) Int. Cl.
| | |
|---|---|
| *H01M 10/14* | (2006.01) |
| *H01M 10/04* | (2006.01) |
| *H01M 10/12* | (2006.01) |
| *B65G 47/90* | (2006.01) |
| *B65G 65/02* | (2006.01) |
| *B65D 57/00* | (2006.01) |

(52) U.S. Cl.
CPC .......... *B65G 47/90* (2013.01); *B65D 57/003* (2020.05); *B65G 65/02* (2013.01); *H01M 10/12* (2013.01)

(58) Field of Classification Search
CPC ...... B65G 49/06; H01M 10/04; H01M 10/12; H01M 10/14
USPC ................................................ 29/623.1, 730
See application file for complete search history.

(56) References Cited

U.S. PATENT DOCUMENTS 4,168,772 A * 9/1979 Eberle .................... B65G 59/08
                                                      29/730
4,534,401 A * 8/1985 Schaumburg .......... B22D 25/04
                                                      164/112

(Continued)

FOREIGN PATENT DOCUMENTS

| JP | H03 214560 A | 9/1991 |
| KP | 1020180083484 | 7/2018 |

(Continued)

OTHER PUBLICATIONS

US 2007/0266553 A1, Schlogl, Nov. 22, 2007.*

(Continued)

*Primary Examiner* — Douglas A Hess
(74) *Attorney, Agent, or Firm* — Marshall, Gerstein & Borun LLP

(57) ABSTRACT

A battery cast-on-strap machine unloading apparatus includes a first and a second unit. Each unit includes a rotary drive mechanism; and, a pinion co-axial with and directly driveable by the rotary drive mechanism. The apparatus further includes an elongate rack. The rack includes teeth along a first side and an opposing second side. The first and second units are mounted adjacent to each other on the rack. Operation of each drive mechanism causes rotation of the respective pinion to be converted into linear motion of the respective unit along the rack. Adjacent rotary drive mechanisms are located on opposing sides of the rack, such that the pinion of the first unit meshes with the teeth along the first side of the rack, and the pinion of the adjacent second unit meshes with the teeth along the opposing second side of the rack.

20 Claims, 4 Drawing Sheets

(56) References Cited

U.S. PATENT DOCUMENTS

| | | | | |
|---|---|---|---|---|
| 4,583,286 | A * | 4/1986 | Schaumburg | H01M 10/14 |
| | | | | 29/730 |
| 4,982,482 | A * | 1/1991 | Wheadon | H01M 10/16 |
| | | | | 429/211 |
| 4,998,340 | A * | 3/1991 | Wheadon | H01M 50/114 |
| | | | | 29/623.3 |
| 5,044,067 | A * | 9/1991 | Wheadon | H01M 4/73 |
| | | | | 29/730 |
| 5,079,111 | A * | 1/1992 | Wheadon | H01M 4/21 |
| | | | | 429/225 |
| 5,459,922 | A | 10/1995 | Hopwood | |
| 6,324,751 | B1 * | 12/2001 | Barge | H01M 10/0404 |
| | | | | 29/730 |
| 8,196,732 | B2 * | 6/2012 | Fatula, Jr. | B66C 17/04 |
| | | | | 198/346.2 |
| 9,287,551 | B2 * | 3/2016 | Kang | H01M 50/543 |
| 9,744,552 | B2 * | 8/2017 | Mendoza | B05C 11/11 |
| 10,446,877 | B2 * | 10/2019 | Friedenberger | C23C 2/10 |
| 2007/0266553 | A1 | 11/2007 | Schlogl | |

FOREIGN PATENT DOCUMENTS

| | | |
|---|---|---|
| WO | WO-88/05608 A1 | 7/1988 |
| WO | WO-97/44846 A1 | 11/1997 |

OTHER PUBLICATIONS

Search Report for British Application No. GB1911949.4, dated Feb. 6, 2020.
European Search Report for Application No. 20189696.6 dated Jan. 19, 2021.

* cited by examiner

UNLOADING APPARATUS

FIELD OF THE INVENTION

This invention relates generally to a cast-on-strap machine unloading apparatus, and related system. More generally, the unloading apparatus of the present invention can be configured to pick up a group of battery plates output from a cast-on-strap machine, and transfer them into a battery container.

BACKGROUND OF THE INVENTION

In the manufacture of batteries, particularly lead acid batteries, cast-on-strap machines are used to cast connectors known as straps onto the lugs of battery plates, for the purpose of providing a connection between a set of plates within a cell of the battery. Typically, straps are cast-on across a pack or group comprising a plurality of battery plates. The lugs of the negative plates within a group are connected via a first cast-on strap, whereas the lugs of the positive plates within the group are connected via a second cast-on strap.

Such groups are then output from the cast-on-strap machine, and require transporting from the cast-on-strap machine into a battery container. Battery containers typically comprise a housing, usually made of plastic. Within the housing are a series of partitions which divide the housing into individual cells. Each cell normally receives a single group of cast-on battery plates.

The groups of battery plates are usually transported from the cast-on strap machine to the battery container using an unloading apparatus, which comprises several gripper mechanisms. The gripper mechanisms are driven linearly along a rack by a motor, between the output from the cast-on strap machine where they pick up the groups of battery plates, and the battery container where they release the groups of battery plates into the appropriate cell within the container.

Typically each gripper mechanism will do this simultaneously, and as such, it is important to set the spacing between each gripper mechanism so that they are all correctly placed to pick up and release their respective group of battery plates.

However, there is a lower limit on the size of battery plate groups, and size of the resulting battery, that can be processed by the cast-on strap machine and unloading apparatus, which is at least in part dictated by the width of the motor used. The gripper mechanisms cannot be brought closer together than the width of the motor. However, switching the standard motor for one with a smaller width has the disadvantage that the smaller motor may not be powerful enough to operate the unloading apparatus, which still needs to be able to handle larger groups of battery plates and produce larger batteries (such as for cars or trucks).

It is an object of embodiments of the present invention therefore to provide an unloading apparatus which can handle smaller groups of battery plates, and thus produce smaller battery sizes, all whilst using a standard motor size.

SUMMARY OF THE INVENTION

In accordance with a first aspect of the present invention, there is provided a battery cast-on-strap machine unloading apparatus, the apparatus comprising:
 a first and a second unit, each unit comprising:
  a rotary drive mechanism; and,
  a pinion co-axial with and directly driveable by the rotary drive mechanism; and,
 an elongate rack, the rack comprising teeth along a first side and an opposing second side,
 wherein the first and second units are mounted adjacent to each other on the rack; and wherein operation of each drive mechanism causes rotation of the respective pinion to be converted into linear motion of the respective unit along the rack; and,
 wherein adjacent rotary drive mechanisms are located on opposing sides of the rack, such that the pinion of the first unit meshes with the teeth along the first side of the rack, and the pinion of the adjacent second unit meshes with the teeth along the opposing second side of the rack.

The apparatus can comprise a plurality of units. The units can be split into a first array and a second array. The first array can be offset along the length of the rack with respect to the second array. Adjacent units of the first array can be interleaved between adjacent units of the second array.

The rotary drive mechanisms and pinions of the first array can be located on the first side of the rack. The rotary drive mechanisms and pinions of the second array can be located on the second side of the rack.

Adjacent interleaved units can be spaced apart by a gap. The width of each gap can be less than the width of each unit. Each rotary drive mechanism in the first array can be configured to overlap with an adjacent rotary drive mechanism in the second array.

The centreline of each unit is defined as the axis of the unit perpendicular to the rack. Placing rotary drive mechanisms along the same side of the rack places a limit on how close the centrelines can be. That is, they are limited by the size (the width) of the rotary drive mechanisms. However, it may be an advantage of embodiments of the present invention that placing adjacent rotary drive mechanisms on opposing sides of the rack, and interleaving rotary drive mechanisms along the first side of the rack with adjacent with rotary drive mechanisms located along the second side of the rack, can allow the centrelines of each unit to be closer together. Reducing the centreline spacing in this way can allow the cast-on-strap machine and unloading apparatus of the present invention to handle smaller groups of battery plates, and produce smaller batteries.

Each unit can further comprise:
 an actuator; and,
 a mechanical gripper co-axial with the actuator, the gripper moveable between an open and closed position by the actuator; and,
 wherein in the closed position, the mechanical gripper is configured to grip and hold a group of battery plates output from the cast-on-strap machine.

Each actuator and corresponding mechanical gripper can be located on the same side of the rack. Each mechanical gripper can be configured to pick up a group of battery plates output from the cast-on-strap machine, and transfer them into a battery container.

The apparatus can further comprise a control module. Each rotary drive mechanism can comprise a position control mechanism configured to detect the position of the unit along the rack. The position control mechanism can be an absolute encoder.

The control module can be configured to:
 calculate the required distance between the centrelines of each unit, given the location of any cell partitions within the battery container;

determine the required position of each unit along the rack, given the location of the battery container with respect to the rack; and, instruct each rotary drive mechanism to move the respective unit along the length of the rack until the position control mechanism detects that the required position has been reached.

Each mechanical gripper can be configured to place their respective group of battery plates directly into the appropriate cell within the battery container.

The required distance between the centrelines of each unit can be at least 50% of the width of the rotary drive mechanism. In embodiments, the width of the rotary drive mechanism can be at least 63 mm. As such, the required distance between the centrelines of each unit can be at least 31.5 mm. For example, at least 40 mm, or at least 50 mm.

Rotary drive mechanisms with a 63 mm width and which are not interleaved, will limit the minimum distance between the centrelines to at least 63 mm (typically it will be greater than this). However, interleaving the rotary drive mechanisms, as described by the present invention, will allow them to overlap with each other to an extent, and thus the centrelines can be brought closer together.

As such, rotary drive mechanisms with a width of 63 mm, can permit a centreline spacing of at least 31.5 mm, for example. The cast-on-strap machine and unloading apparatus of the present invention can therefore handle groups of battery plates having much smaller dimensions, without the need to have smaller (and less powerful) rotary drive mechanisms. The resulting batteries will also have much smaller dimensions.

The unloading apparatus of the present invention can therefore produce a much wider range of battery sizes, particularly smaller battery sizes, without the need to modify the machinery (such as switch the rotary drive mechanism for a smaller one) or provide any specialised equipment.

The pinion can be a toothed gear. For example, the pinion can be a spur gear.

Each rotary drive mechanism can be a motor. For example, each rotary drive mechanism can be a servo motor.

In accordance with a second aspect of the present invention, there is provided a system comprising:

the unloading apparatus according to the first aspect of the invention;

a plurality of battery plates or groups; and, a battery container;

wherein, the plurality of battery plates or groups are located at the output of a cast-on-strap machine; and wherein the unloading apparatus is configured to pick up the battery plates or groups from the output, and transfer them into the battery container.

The battery container can be partitioned into individual cells. The unloading apparatus can be configured to pick up the battery plates or groups from the output, and transfer them into the appropriate cell within the battery container.

The distance between the centre points of adjacent cells can be at least 50% of the width of the rotary drive mechanism. As such, if the rotary drive mechanism has a width of 63 mm, the distance between the centre points of adjacent cells can be at least 31.5 mm. For example, at least 40 mm, or at least 50 mm.

Whilst the invention has been described above, it extends to any inventive combination set out above, or in the following description or drawings.

BRIEF DESCRIPTION OF THE DRAWINGS

The invention may be performed in various ways, and an embodiment thereof will now be described by way of example only and with reference to the accompanying drawings, in which.

DETAILED DESCRIPTION OF EMBODIMENTS

Figure 1:
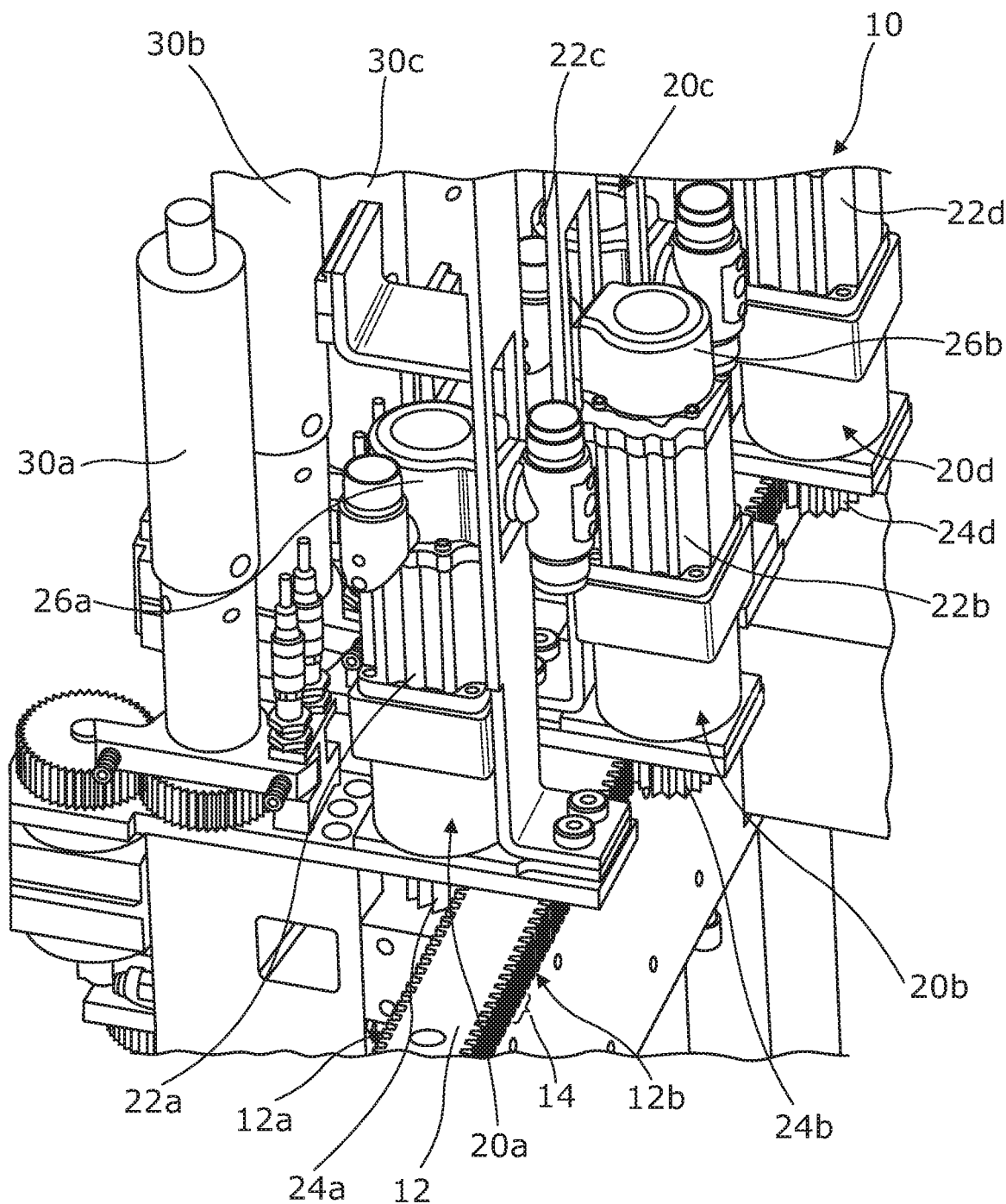
FIG. 1 shows a close-up view of the unloading apparatus, in accordance with the present invention.
Figure 3:
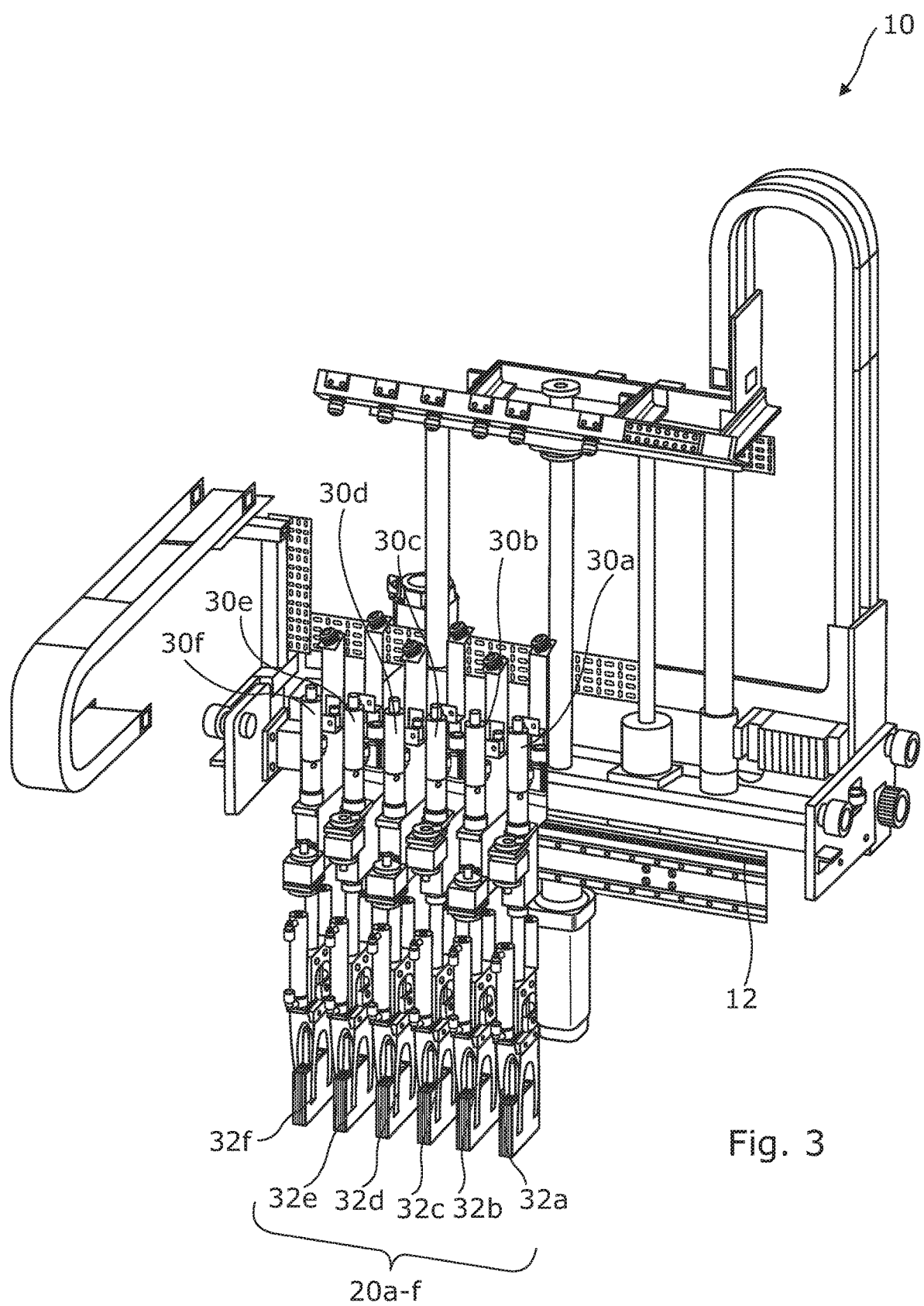
FIG. 3 shows a front view of the unloading apparatus, in accordance with the present invention; and, FIG. 4 shows a rear view of the FIG. 3 unloading apparatus.
Figure 4:
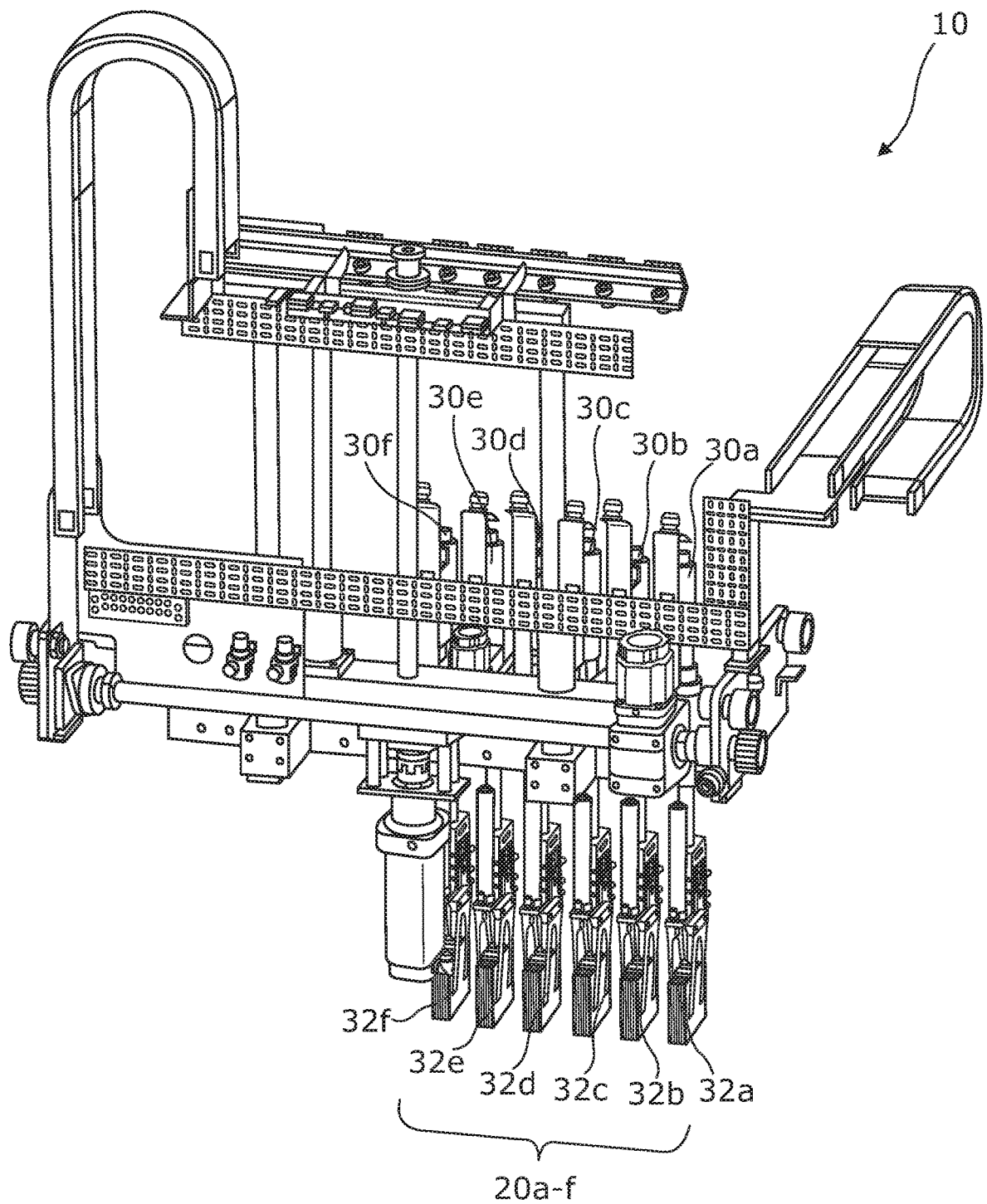

FIG. 1 shows a close up view of a cast-on-strap machine unloading apparatus 10. FIGS. 3 and 4 show that the apparatus 10 comprises six units 20a, 20b, 20c, 20d, 20e, and 20f, four of which are shown in the close-up view in FIG. 1.

Figure 2:
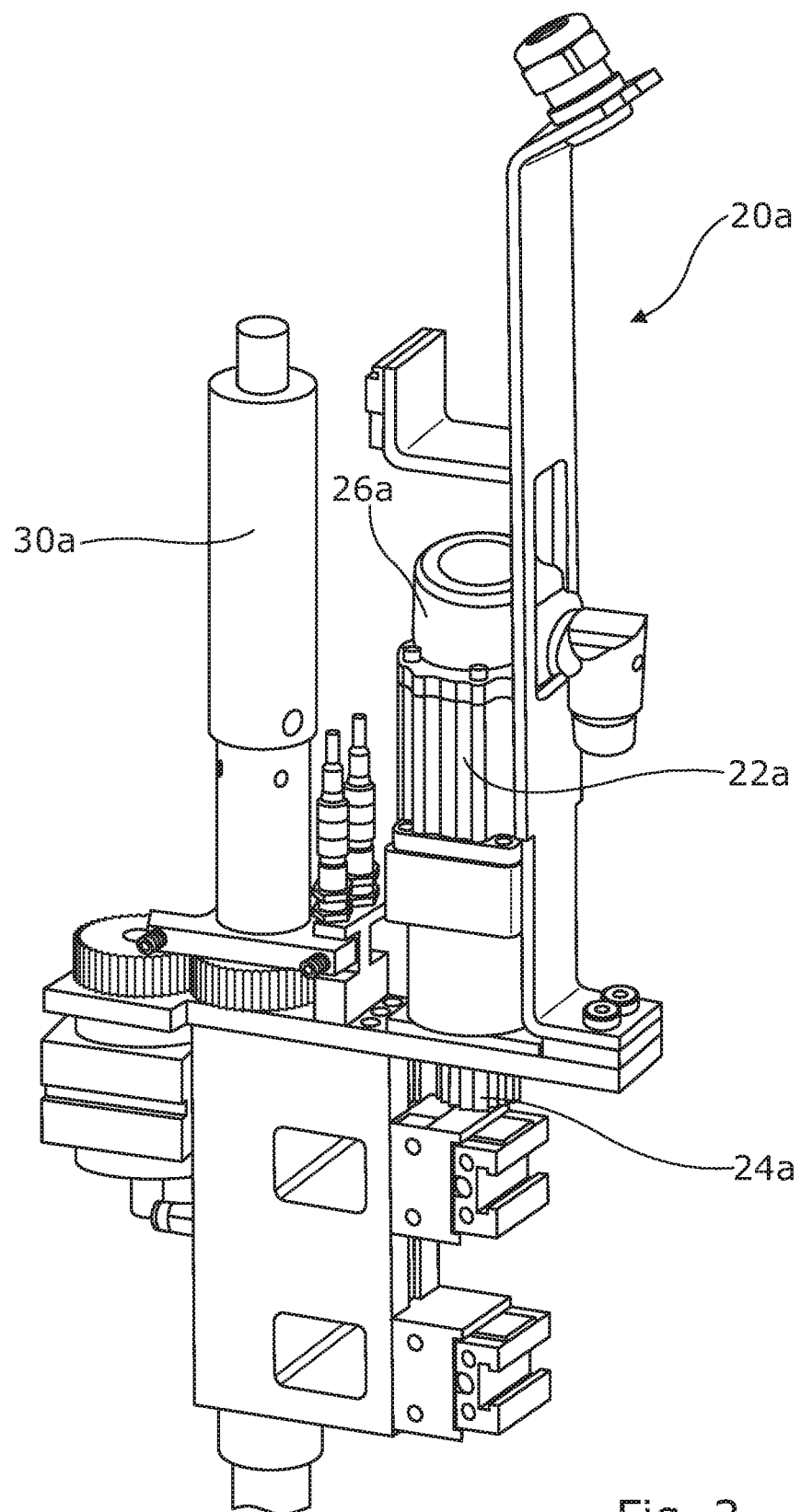
FIG. 2 shows a side view of a single unit.

Units 20a, 20c and 20e are the same, and units 20b, 20d and 20f are the same. The overall design of adjacent units differs slightly in order for the components to interleave along a rack, as will be described in more detail below, but the components and functionality are the exactly same, and so only one unit will be described in detail here. FIG. 2 shows unit 20a in more detail. Unit 20a comprises a rotary drive mechanism 22a and a pinion 24a. The rotary drive mechanism 22a and the pinion 24a are co-axial. The rotary drive mechanism 22a is in the form of a servo motor, and the pinion 24a is a toothed wheel-shaped gear. The pinion 24a is driveable by the servo motor 22a.

The unloading apparatus 10 also comprises an elongate rack 12. The rack 12 comprises teeth 14 extending along a first side 12a and an opposing second side 12b.

The units 20a-f are mounted adjacent to each other along the rack 12. Adjacent pinions 24a-f mesh with opposing sides of the rack 12.

As can be seen in the zoomed in view of FIG. 1, adjacent pinions 24a-d mesh with opposite sides 12a, 12b of the rack 12. That is, pinions 24a and 24c form part of a first array and mesh with the first side 12a of the rack 12, whereas pinions 24b and 24d form part of a second array and mesh with the second side 12b of the rack 12. Given the co-axial nature of each servo motor 22a-f with its respective pinion 24a-f, adjacent servo motors 22a-f are also located on opposing sides of the rack 12. That is, servo motors 22a and 22c are located on the first side 12a of the rack, and servo motors 22b and 22d are located on the second side 12b of the rack 12. As such, the units comprising servo motors 22a and 22c are interleaved with the units comprising servo motors 22b and 22d. As best seen in FIG. 1, adjacent interleaved units, such as 20a and 20b, are separated by a gap. The width of this gap can be less than the width of each servo motor.

The centreline of each unit 20a-f is defined as the axis of the unit perpendicular to the rack. Each servo motor 22a-f has a width of around 63 mm, which is the smallest size of standard motor which can interface to an Allen Bradley® servo drive. When the motors are arranged side-by-side, the minimum distance between the centrelines of adjacent units is at least 63 mm. This places a lower limit on the size of battery plate groups that can be processed by the unloading apparatus.

However, arranging adjacent motors along opposing sides of the rack, as best shown in FIG. 1, allows adjacent servo motors to overlap, so that the distance between the centrelines of adjacent interleaved units 20a-f can be much closer together. In general, the distance between the centrelines of each unit can be at least 50% of the width of the rotary drive mechanism. In this example, the distance between adjacent centrelines is at least 50 mm. However, the distance between the centrelines of adjacent interleaved units 20a-f can be as little as 31.5 mm, thus allowing the apparatus 10 to process even smaller sized groups of battery plates, and produce even smaller batteries.

As shown best in FIGS. 3 and 4, each unit 20a-f also comprises an actuator 30a-f and a mechanical gripper 32a-f. Each actuator 30a-f is co-axial with its respective gripper 32a-f. Each gripper 32a-f is moveable between an open and closed position by its respective actuator 30a-f.

Each actuator 30a-f and gripper mechanism 32a-f is located on the second side 12b of the rack 12. Placing the gripper mechanisms 32a-f on the same side of the rack makes it easier for the gripper mechanisms 32a-f to pick up a group of battery plates output from the cast-on-strap machine, and transfer them into a battery container. For example, each gripper mechanism 32a-f can be configured to transfer its group of battery plates directly into an appropriate cell within the battery container.

The apparatus 10 comprises a control module (not shown) which controls the operation of the unloading apparatus 10. Each servo motor 22a-f is located within an enclosure along with a position control mechanism 26a-f, in the form of an absolute encoder. Each absolute encoder 26a-f is located above its respective servo motor 22a-f, and is configured to detect the position of its respective unit 20a-f along the rack 12.

In use, groups of battery plates are processed by the cast-on-strap machine, and then delivered to the output section of the machine. The control module then receives a signal to indicate that there are groups of battery plates at the output from the cast-on-strap machine which need to be transferred into a battery container. The dimensions and structural information of the battery container is pre-programmed into the control module by an operator before the unloading apparatus 10 is operated.

The control module then instructs each servo motor 22a-f to move its respective unit 20a-f along the length of the rack 12, so that its respective mechanical gripper 32a-f can pick up the groups of battery plates from the output from the cast-on-strap machine. In use, the operation of each servo motor 22a-f causes rotation of its respective pinion 24a-f to be converted into linear motion of its respective unit along the rack 12. Once each gripper mechanism 32a-f is located above a group of battery plates, each actuator 30a-f is instructed to move the gripper mechanism 32a-f from the open to the closed position, so that each gripper mechanism 32a-f clamps and picks-up a group of battery plates.

With reference to the battery container geometry, such as the dimensions of any cell partitions, the control module can then calculate the required distance between the centrelines of each unit 20a-f. For example, if each cell within the container is 50 mm in width (that is, the centre points of adjacent cells are 50 mm apart), then the centrelines of adjacent units will need to be 50 mm apart.

The control module also determines the required position of each unit 20a-f along the rack 12, based on the location of the battery container with respect to the rack 12. It is important that the units are placed at the correct location along the rack 12 and at the correct distance from each other, so that the gripper mechanisms 32a-f can accurately and precisely transfer the groups of battery plates into the correct cell.

The control module instructs each servo motor 22a-f to move its respective unit 20a-f along the length of the rack 12 until its respective absolute encoder detects that the required position has been reached, both with respect to the rack 12 and adjacent units 20a-f. Each gripper mechanism 32a-f is now located above the appropriate cell of the battery container.

The control module then instructs each actuator 30a-f to move the gripper mechanism 32a-f from the closed to the open position, so that each gripper mechanism 32a-f releases its respective group of battery plates into the appropriate cell of the battery container.

Although the invention has been described above with reference to an exemplary embodiment, it will be appreciated that various changes or modifications may be made without departing from the scope of the invention as defined in the appended claims.

The invention claimed is:

1. A battery cast-on-strap machine unloading apparatus, the apparatus comprising:
   a first and a second unit, each unit comprising:
      a rotary drive mechanism; and,
      a pinion co-axial with and directly driveable by the rotary drive mechanism; and,
   an elongate rack, the rack comprising teeth along a first side and an opposing second side,
   wherein the first and second units are mounted adjacent to each other on the rack; and wherein operation of each drive mechanism causes rotation of the respective pinion to be converted into linear motion of the respective unit along the rack; and,
   wherein adjacent rotary drive mechanisms are located on opposing sides of the rack, such that the pinion of the first unit meshes with the teeth along the first side of the rack, and the pinion of the adjacent second unit meshes with the teeth along the opposing second side of the rack.

2. The unloading apparatus as claimed in claim 1, comprising a plurality of units split into a first array and a second array, the first array being offset along the length of the rack with respect to the second array, such that adjacent units of the first array are interleaved between adjacent units of the second array.

3. The unloading apparatus as claimed in claim 2, wherein the rotary drive mechanisms and pinions of the first array are located on the first side of the rack, and the rotary drive mechanisms and pinions of the second array are located on the second side of the rack.

4. The unloading apparatus as claimed in claim 3, wherein adjacent interleaved units are spaced apart by a gap, and wherein the width of each gap is less than the width of each unit, such that each rotary drive mechanism in the first array is configured to overlap with an adjacent rotary drive mechanism in the second array.

5. The unloading apparatus as claimed in claim 1, wherein each unit further comprises:
   an actuator; and,
   a mechanical gripper co-axial with the actuator, the gripper moveable between an open and closed position by the actuator; and,
   wherein in the closed position, the mechanical gripper is configured to grip and hold a group of battery plates output from the cast-on-strap machine.

6. The unloading apparatus as claimed in claim 5, wherein each actuator and corresponding mechanical gripper is located on the same side of the rack.

7. The unloading apparatus as claimed in claim 5, wherein each mechanical gripper is configured to pick up a group of battery plates output from the cast-on-strap machine, and transfer them into a battery container.

8. The unloading apparatus as claimed in claim 1, further comprising a control module.

9. The unloading apparatus as claimed in claim 8, wherein each rotary drive mechanism comprises a position control mechanism configured to detect the position of the unit along the rack.

10. The unloading apparatus as claimed in claim 9, wherein the position control mechanism is an absolute encoder.

11. The unloading apparatus as claimed in claim 9, wherein a centerline of each unit is defined as the axis of the unit perpendicular to the rack; and wherein the control module is configured to:
   calculate the required distance between the centerlines of each unit, given the location of any cell partitions within a battery container;
   determine the required position of each unit along the rack, given the location of the battery container with respect to the rack; and,
   instruct each rotary drive mechanism to move the respective unit along the length of the rack until the position control mechanism detects that the required position has been reached.

12. The unloading apparatus as claimed in claim 11, wherein each mechanical gripper is configured to place their respective group of battery plates directly into the appropriate cell within the battery container.

13. The unloading apparatus as claimed in claim 11, wherein the required distance between the centerlines of each unit is at least 50% of the width of the rotary drive mechanism.

14. The unloading apparatus as claimed in claim 1, wherein the width of the rotary drive mechanism is at least 63 mm.

15. The unloading apparatus as claimed in claim 1, wherein the pinion is a toothed gear.

16. The unloading apparatus as claimed in claim 1, wherein each rotary drive mechanism is a motor.

17. The unloading apparatus as claimed in claim 16, wherein each rotary drive mechanism is a servo motor.

18. A system comprising:
   the unloading apparatus as claimed in claim 1;
   a plurality of battery plates or groups; and,
   a battery container;
   wherein, the plurality of battery plates or groups are located at an output of a cast-on-strap machine; and
   wherein the unloading apparatus is configured to pick up the battery plates or groups from the output, and transfer them into the battery container.

19. The system as claimed in claim 18, wherein the battery container is partitioned into individual cells, and the unloading apparatus is configured to pick up the battery plates or groups from the output, and transfer them into the appropriate cell within the battery container.

20. The system as claimed in claim 18, wherein a distance between the center points of adjacent cells is at least 50% of the width of the rotary drive mechanism.

* * * * *